United States Patent
Buchan et al.

(10) Patent No.: US 12,267,426 B2
(45) Date of Patent: Apr. 1, 2025

(54) SYSTEMS AND METHODS FOR IMPLEMENTING INDIRECT CERTIFICATE PINNING

(71) Applicant: WORLDR TECHNOLOGIES LIMITED, Slough (GB)

(72) Inventors: Maximilian Alastair Buchan, Slough (GB); Dzmitry Maskaliou, Slough (GB); Michael Antipin, Slough (GB); Yann Golanski, Slough (GB)

( * ) Notice: Subject to any disclaimer, the term of this patent is extended or adjusted under 35 U.S.C. 154(b) by 259 days.

(21) Appl. No.: 17/857,774

(22) Filed: Jul. 5, 2022

(65) Prior Publication Data
US 2023/0082949 A1 Mar. 16, 2023

(30) Foreign Application Priority Data
Jul. 2, 2021 (GB) ...................... 2109574

(51) Int. Cl.
*H04L 9/30* (2006.01)
*H04L 9/32* (2006.01)
(52) U.S. Cl.
CPC .............. *H04L 9/30* (2013.01); *H04L 9/3263* (2013.01)
(58) Field of Classification Search
CPC ................ H04L 9/30; H04L 9/3263

USPC ........................................................ 713/171
See application file for complete search history.

(56) References Cited

U.S. PATENT DOCUMENTS

2020/0028699 A1* 1/2020 Sharifi Mehr ............ H04L 9/14

* cited by examiner

*Primary Examiner* — Lan Dai T Truong
(74) *Attorney, Agent, or Firm* — RC Trademark Company

(57) ABSTRACT

Disclosed is a system for implementing indirect certificate pinning. The system comprises a client device configured to execute client application having a public signing key pinned thereto, and a certificate information server communicably coupled with client device. Upon execution, the client application is configured to: send, to certificate information server, a connection request; receive, from certificate information server, a security certificate of certificate information server and signing information pertaining to the security certificate, wherein signing information comprises: signatures of security certificate for at least one signing key pair that is valid at a time of receiving connection request, a version number of the at least one signing key pair, expiration details of the at least one signing key pair; and validate the signatures using the security certificate and the public signing key, for enabling connection of the client device with the certificate information server.

16 Claims, 5 Drawing Sheets

SYSTEMS AND METHODS FOR IMPLEMENTING INDIRECT CERTIFICATE PINNING

TECHNICAL FIELD

The present disclosure relates to systems for implementing indirect certificate pinning. The present disclosure also relates to methods for implementing indirect certificate pinning. The present disclosure also relates to client devices arranged to be used in systems for implementing indirect certificate pinning. The present disclosure also relates to certificate information servers arranged to be used in systems for implementing indirect certificate pinning.

BACKGROUND

Over the past few decades, use of client-server model has gained immense popularity globally, due to continued technological advancements in computing. The client-server model is an application structure that partitions tasks or workloads in a distributed manner between servers (which are providers of a resource or service) and clients (which are requestors of the resource or service).

Typically, clients and servers often communicate over computer networks. However, in such a case, there is always a risk of a 'Man in the Middle' (MITM) attack. The MITM attack can be described as an undesirable situation wherein a third-party position themselves in a communication between a client application executing on a client device and the server, with the intention of either to eavesdrop or to impersonate one of these parties, deceptively making it appear to the parties as if a normal communication is underway.

In recent times, in order to overcome the problem of the MITM attack, a process of 'Certificate Pinning' is popularly employed. The process of certificate pinning is implemented by inserting or pinning a security certificate of the server into the client application. Then, every time the client application wants to connect to the server, the client application can check the authenticity of the server by checking if the certificate used by the server matches the one that is pinned into the client application. Once the certificates match and the server gets authenticated, a secure connection is established between the client application and the server.

However, this process of certificate pinning has a few disadvantages as well. Firstly, for security reasons, the server has to typically renew its certificate once in every few months. This renewal means that the old certificate pinned to the client application is no longer valid and because of this, the client application can no longer connect to the server. The client application is required to be constantly updated each time the server undergoes renewal in order to maintain its connection with the server. This constant updating is very cumbersome. Secondly, this straightforward certificate pinning makes it impractical to use automation for certificate life cycle management. An industry-standard solution for certificate life cycle management, such as 'Automated Certificate Management Environment' (ACME) protocol, allows an automated renewal of the certificate on a regular basis without human interaction. However, the automated renewal of certificate does not work well with direct certificate pinning, so communication between the client application and the server is disrupted upon each renewal of the certificate.

Therefore, in light of the foregoing discussion, there exists a need to overcome the aforementioned drawbacks associated with existing techniques for certificate pinning.

SUMMARY

The present disclosure seeks to provide a system for implementing indirect certificate pinning. The present disclosure also seeks to provide a method for implementing indirect certificate pinning. The present disclosure also seeks to provide a client device arranged to be used in a system for implementing indirect certificate pinning. The present disclosure also seeks to provide a certificate information server arranged to be used in a system for implementing indirect certificate pinning. An aim of the present disclosure is to provide a solution that overcomes at least partially the problems encountered in prior art.

In one aspect, an embodiment of the present disclosure provides a system for implementing indirect certificate pinning, the system comprising:
  a client device configured to execute a client application, the client application having a public signing key pinned thereto; and
  a certificate information server communicably coupled with the client device,
  wherein, upon execution, the client application is configured to:
    send, to the certificate information server, a connection request for connecting to the certificate information server;
    receive, from the certificate information server, a security certificate of the certificate information server and signing information pertaining to the security certificate, wherein the signing information comprises: signatures of the security certificate for at least one signing key pair that is valid at a time of receiving the connection request at the certificate information server, a version number of the at least one signing key pair, expiration details of the at least one signing key pair; and
    validate the signatures using the security certificate and the public signing key, for enabling connection of the client device with the certificate information server.

In another aspect, an embodiment of the present disclosure provides a method for implementing indirect certificate pinning, the method being implemented by a system comprising a client device configured to execute a client application, the client application having a public signing key pinned thereto, and a certificate information server communicably coupled with the client device, the method comprising:
  sending, from the client application to the certificate information server, a connection request for connecting to the certificate information server;
  receiving, from the certificate information server at the client application, a security certificate of the certificate information server and signing information pertaining to the security certificate, wherein the signing information comprises: signatures of the security certificate for at least one signing key pair that is valid at a time of receiving the connection request at the certificate information server, a version number of the at least one signing key pair, expiration details of the at least one signing key pair; and
  validating the signatures using the security certificate and the public signing key, for enabling connection of the client device with the certificate information server.

In yet another aspect, an embodiment of the present disclosure provides a client device arranged to be used in a system for implementing indirect certificate pinning, the system comprising the client device and a certificate information server communicably coupled with the client device, wherein the client device is configured to execute a client application to:

send, to a certificate information server, a connection request for connecting to the certificate information server;

receive, from the certificate information server, a security certificate of the certificate information server and signing information pertaining to the security certificate, wherein the signing information comprises: signatures of the security certificate for at least one signing key pair that is valid at a time of receiving the connection request at the certificate information server, a version number of the at least one signing key pair, expiration details of the at least one signing key pair; and validate the signatures using the security certificate and a public signing key, for enabling connection of the client device with the certificate information server, wherein the public signing key is pinned to the client application.

In still another aspect, an embodiment of the present disclosure provides a certificate information server arranged to be used in a system for implementing indirect certificate pinning, the certificate information server being communicably coupled with a client device of the system, the client device being configured to execute a client application and the client application having a public signing key pinned thereto, wherein the certificate information server is configured to:

receive, from the client device, a connection request for connecting to the certificate information server;

send, to the client device, a security certificate of the certificate information server and signing information pertaining to the security certificate, wherein the signing information comprises: signatures of the security certificate for at least one signing key pair that is valid at a time of receiving the connection request at the certificate information server, a version number of the at least one signing key pair, expiration details of the at least one signing key pair; and enable connection with the client device upon validation, by the client device, of the signatures using the security certificate and the public signing key.

Embodiments of the present disclosure substantially eliminate or at least partially address the aforementioned problems in the prior art, and enable efficient indirect certificate pinning which establishes secure connections between different system devices, ensures continuity of such connections without disruption when security certificates are updated, and also protects effectively against security attacks.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
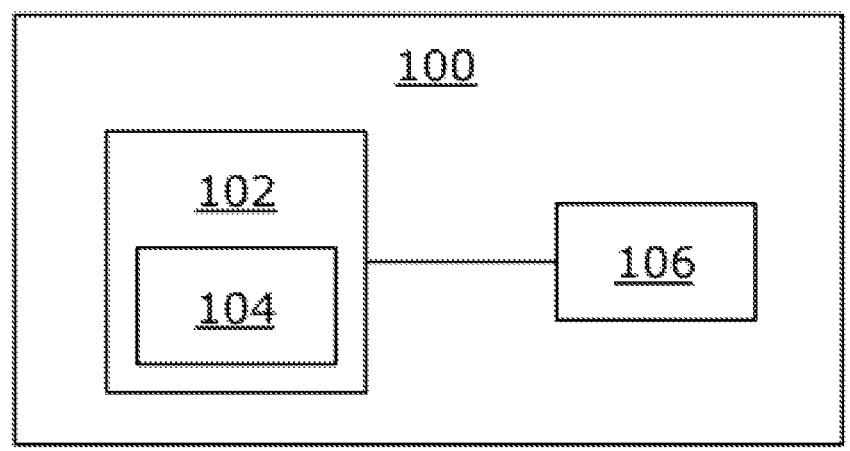
FIG. 1 is an architecture of a system for implementing indirect certificate pinning, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system for implementing indirect certificate pinning, the system comprising:

a client device configured to execute a client application, the client application having a public signing key pinned thereto; and a certificate information server communicably coupled with the client device, wherein, upon execution, the client application is configured to:

send, to the certificate information server, a connection request for connecting to the certificate information server;

receive, from the certificate information server, a security certificate of the certificate information server and signing information pertaining to the security certificate, wherein the signing information comprises: signatures of the security certificate for at least one signing key pair that is valid at a time of receiving the connection request at the certificate information server, a version number of the at least one signing key pair, expiration details of the at least one signing key pair; and validate the signatures using the security certificate and the public signing key, for enabling connection of the client device with the certificate information server.

In another aspect, an embodiment of the present disclosure provides a method for implementing indirect certificate pinning, the method being implemented by a system comprising a client device configured to execute a client application, the client application having a public signing key pinned thereto, and a certificate information server communicably coupled with the client device, the method comprising:

sending, from the client application to the certificate information server, a connection request for connecting to the certificate information server;

receiving, from the certificate information server at the client application, a security certificate of the certificate information server and signing information pertaining to the security certificate, wherein the signing information comprises: signatures of the security certificate for at least one signing key pair that is valid at a time of receiving the connection request at the certificate information server, a version number of the at least one signing key pair, expiration details of the at least one signing key pair; and validating the signatures using the security certificate and the public signing key, for enabling connection of the client device with the certificate information server.

In yet another aspect, an embodiment of the present disclosure provides a client device arranged to be used in a system for implementing indirect certificate pinning, the system comprising the client device and a certificate information server communicably coupled with the client device, wherein the client device is configured to execute a client application to:

send, to a certificate information server, a connection request for connecting to the certificate information server;

receive, from the certificate information server, a security certificate of the certificate information server and signing information pertaining to the security certificate, wherein the signing information comprises: signatures of the security certificate for at least one signing key pair that is valid at a time of receiving the connection request at the certificate information server, a version number of the at least one signing key pair, expiration details of the at least one signing key pair; and validate the signatures using the security certificate and a public signing key, for enabling connection of the client device with the certificate information server, wherein the public signing key is pinned to the client application.

In still another aspect, an embodiment of the present disclosure provides a certificate information server arranged to be used in a system for implementing indirect certificate pinning, the certificate information server being communicably coupled with a client device of the system, the client device being configured to execute a client application and the client application having a public signing key pinned thereto, wherein the certificate information server is configured to:

receive, from the client device, a connection request for connecting to the certificate information server;

send, to the client device, a security certificate of the certificate information server and signing information pertaining to the security certificate, wherein the signing information comprises: signatures of the security certificate for at least one signing key pair that is valid at a time of receiving the connection request at the certificate information server, a version number of the at least one signing key pair, expiration details of the at least one signing key pair; and enable connection with the client device upon validation, by the client device, of the signatures using the security certificate and the public signing key.

The present disclosure provides the aforementioned system and the aforementioned method for implementing indirect certificate pinning. The present disclosure also provides the client device and the certificate information server arranged to be used in the aforementioned system. As a solution to the problems associated with direct certificate pinning, the process of indirect certificate pinning described herein is one in which security certificate life cycle is decoupled from the client application and target server application update flow. The decoupling of the of indirect certificate pinning is much more efficient and effective as compared to the straightforward direct certificate pinning that is presently being used. The indirect certificate pinning involves the client application having a versioned public signing key of the server pinned thereto, which would enable the client application to efficiently check the certificate signatures that the client information server provides. The client information server owns a private part of the at least one signing key pair and can produce a signature for any security certificate under the control of Automated Certificate Management Environment (ACME) protocol that is currently valid. The connection between the client application and the certificate information server is securely established using indirect certificate pinning and this connection doesn't break down even when the security certificate of the client information server is nearing its expiration date. The system also eliminates any need of any human involvement in the updating of the security certificate life cycle, and is therefore practical to implement. The method described herein is effective, easy to implement, ensures establishment of secure connections, and is reliable.

The system enables indirect certificate pinning of the certificate information server in the client application. The phrase "indirect certificate pinning" means that the system pins the public signing key of the certificate information server to the client application for indirectly pinning the security certificate of the certificate information server to the client application, instead of directly pinning the security certificate of the certificate information server to the client application at build time. In indirect certificate pinning, the pinned public signing key is used to authenticate the certificate information server, whereas in direct certificate pinning, a pinned security certificate is required to authenticate the certificate information server. Indirect certificate pinning is decoupled from security certificate lifecycle as it involves pinning of public signing keys, but direct certificate pinning is dependent on security certificate lifecycle as it involves pinning of security certificates. Beneficially, in the system, the security certificate is being indirectly pinned to the client application, thereby effectively establishing and maintaining connection between the client application and the certificate information server, irrespective of security certificate life cycle for effectively overcoming the limitations of direct certificate pinning.

Throughout the present disclosure, the term "client device" refers to a computing device that is associated with a user and is capable of executing the client application. Optionally, the client device comprises a processor that is configured to execute the client application. Optionally, the client device refers to a smartphone, a tablet, a laptop, a desktop-computer, a workstation, and so forth. It will be appreciated that in some instances, a single client device may be utilised, whereas in other instances, a plurality of client devices may be utilised simultaneously. Herein, the term "user" may pertain to a person or a group of persons associated with the client device.

Throughout the present disclosure, the term "client application" refers to a software application that comprises a set of instructions which are executable to perform steps of the aforementioned method. Optionally the client application pertains to a business communication, a social networking communication, an internet of things (IoT) communication, an e-commerce communication, a healthcare communication, a reservation communication, a banking communication, and so forth. It will be appreciated that the client application could also pertain to other suitable domains besides the ones listed hereinabove.

The public signing key is a portion of the at least one signing key pair of the certificate information server, which is pinned to the client application. Herein, the public signing key may be pinned to the client application when the client application is created (i.e., at build time). In other words, the indirect certificate pinning is done at the build time of the client application. The public signing key may be pinned to the client application during a compilation stage of the client application wherein the public signing key is provided by the certificate information server to the client application and is applied (i.e., baked) in the client application. Moreover, the public signing key is versioned (i.e, it has a version number associated therewith). A given version of the public signing key is valid only for a specific period of time, as long is its corresponding signing key pair is valid. When the corresponding signing key pair undergoes key rotation (described later), the client application is required to be updated eventually (i.e., not immediately). The update to the client application would have a new version of the public signing key baked-in. Optionally, the public signing key is generated using a digital signature scheme, including but not limited to Ed25519 (Edwards-25519), EDCSA (Elliptic Curve Digital Signature Algorithm), EdDSA (Edwards-curve Digital Signature Algorithm), Shamir's Secret Sharing (SSS), Schnorr signatures, or BLS (Bohen-Lynn-Shacham) signatures.

Throughout the present disclosure, the term "certificate information server" refers to hardware, software, firmware, or a combination of these that provides resources to the client application. The resources may include but not be limited to data, services, or programs required for implementing indirect certificate pinning. Herein, the certificate information server has its security certificate set up, and provides the security certificate and the signing information of the certificate information server to the client application. It will be appreciated that the certificate information server may store, and provide the resources to other servers, applications, and devices as well.

Optionally, the certificate information server is communicably coupled to the client application via a first communication network. It will be appreciated that a given communication network may be wired, wireless, or a combination thereof. Examples of the given communication network may include, but are not limited to, Internet, a local network (such as, a TCP/IP-based network, an Ethernet-based local area network, an Ethernet-based personal area network, a Wi-Fi network, and the like), Wide Area Networks (WANs), Metropolitan Area Networks (MANs), a telecommunication network, and a radio network. Optionally, the certificate information server and the client application are connected via an Application Programming Interface (API) in the first communication network.

The term "connection request" refers to a request for connection made by one device that is trying to connect to another device. The connection request is made by the client application to the certificate information server, indicating that the client application wishes to establish a secure communication with the certificate information server. Optionally, the connection request is sent via the communicable coupling of the client device with the certificate information server. Since the client device is communicably coupled to the certificate information server, the client application is able to interact with the certificate information server. Optionally, the connection request is a Transport Layer Security (TLS) connection request. Alternatively, optionally, the connection request is based on any other cryptographic protocol (for example, such as Secure Sockets Layer) that is designed to provide communications security over the given communication network. On receiving the connection request from the client application, the certificate information server provides its security certificate and the signing information to the client application.

The signing information refers to information pertaining to signing of the security certificate of the certificate information server. The signing information includes the signatures of the security certificate and details of the at least one signing key pair of the certificate information server, that are utilised to sign the security certificate of the certificate information server. Such signing information assists in authenticating the security certificate and eventually enabling the connection of the client device with the certificate information server. Optionally, a given signature for a given signing key pair is generated using content of the security certificate and a private key of the given signing key pair, wherein a public key of the given signing key pair is calculated using the private key of the given signing key pair. Optionally, in this regard, the given signature for a given signing key pair is generated using a signing algorithm. Such a manner of generating the given signature ensures security from unwanted threats, for example, data leaks, hackers, man in the middle attacks, and so forth. Optionally, the expiration details of the at least one signing key pair include an expiration date and time of the at least one signing key pair.

A security certificate of a given device refers to a digital certificate that is utilised as a security means through which identity, authenticity and reliability of the given device is established. The security certificate of the given device is an electronic document that includes information indicative of deployment data of the given device, details of at least one signing key pair of the given device, signatures of the security certificate, and similar. By the security certificate of the certificate information server, the identity, authenticity and reliability of the certificate information server is established. Examples of a given security certificate include, but are not limited to, a Transport Layer Security (TLS) certificate, a Secure Socket Layer (SSL) certificate, an e-mail certificate, a Europay Mastercard and Visa (EMV) certificate, a code signing certificate, a qualified certificate, a root certificate, and an intermediate certificate.

Furthermore, optionally, the security certificate of a given device comprises information indicative of a security level of the given device. The security level quantifies a level of security being offered by the given device (herein, the certificate information server). For example, a device that is (completely) secure may have a higher security level than another device which is susceptible to attacks.

Optionally, a given signing key pair comprises a private key and a public key, the given signing key pair being associated with a corresponding version number and expiration date and time. The given signing key pair is generated using key pair generation techniques. Optionally, the private key and the public key are generated together, and thence, associated (i.e., tied) together. This means that the private key and the public key are generated based on the same security mechanism. Such a generation of the private key and the public key ensures that the signature for the given signing key pair is not validated by any other unauthorized key or method, thereby providing for authentic verification of the signature and subsequently safe communication between any two system elements (for example, such as the client device and the certificate information server) of the system. Alternatively, optionally, the private key and the public key are not generated together, however they are tied together after the time of generation. This means that although the private key and the public key are generated based on different security mechanisms, the private key and the public key are tied together, and are capable of being used for signing the security certificate.

Optionally, in this regard, the private key and the public key of the given signing key pair may be stored at the certificate information server. Optionally, a public key of one of the at least one signing key pair corresponds to the public signing key which is pinned to the client application during creation of the client application.

Optionally, the given signing key pair is generated using a digital signature scheme, including but not limited to Ed25519 (Edwards-25519), EDCSA (Elliptic Curve Digital Signature Algorithm), EdDSA (Edwards-curve Digital Signature Algorithm), Shamir's Secret Sharing (SSS), Schnorr signatures, or BLS (Bohen-Lynn-Shacham) signatures.

It will be appreciated that the private key and the public key of the given signing key pair are used such that the signature (of the security certificate) for the given signing key pair is validated accurately. Typically, a given signature is calculated from a given piece of data (i.e., the content of the security certificate) and a corresponding private key by a signing algorithm. The content of the security certificate to be signed and the private key by which the security certificate is to be signed are inputs to the signing algorithm, while the given signature is an output of the signing algorithm. Notably, the signing algorithm has a verifying algorithm counterpart. The verifying algorithm allows for quickly and accurately checking (i.e., validating) that the given signature was indeed calculated using the given piece of data and the private key that is a pair to the (pinned) public signing key.

The version number of the given signing key pair is a reference number associated with the given signing key pair, which represents a particular edition of the given signing key pair. A form of the version number may be alphabetical and/or numerical. The version number may be determined by the certificate information server upon generation of the given signing key pair. A sequence of version number(s) to be used for the given signing key pair may also be determined by the certificate information server. As an example, the given signing key pair may have the version number 0011. As another example, the given signing key pair may have the version number v01. As yet another example, the given signing key pair may have the version number XyC234.

It will be appreciated that the security certificate is not permanent and is valid only for a specific time duration (which could be in terms of days, weeks, months, years, or similar) after its creation. The security certificate expires upon expiration of the specific time duration. Moreover, the given signing key pair is provided with the expiration date and time. The given signing key pair is valid only until the expiration date and time is reached, for a time duration which could be terms of days, weeks, months, years, or similar. In an example, the expiration date and time of the given signing key pair is different from the expiration date and time of the security certificate. As an example, if the security certificate expires in 825 days from its generation, the given signing key pair expires in 25 days. In another example, the expiration date and time of the given signing key pair is same as the expiration date and time of the security certificate. As an example, if the security certificate expires in 2 years from its generation, the given signing key pair will also expire in 2 years.

Optionally, an industry-standard solution for certificate life cycle management, which allows an automated renewal of the security certificate on a regular basis without human interaction, is used by the system elements in the system for managing life cycle of the security certificate. The industry-standard solution may, for example, be 'Automated Certificate Management Environment' (ACME) protocol.

Optionally, the certificate information server is configured to execute a first application to at least produce the signing information. The first application refers to a software application that comprises a set of instructions which are executable to at least maintain and produce the signing information. The signing information is produced using well known signature generation techniques, version number generation techniques, signing key pair life cycle management techniques, signing key pair generation techniques, or similar. Optionally, the certificate information server is configured to store the signing information at a data repository that is communicably coupled with the certificate information server. The signing information may be stored in an organized (namely, structured) manner, thereby, allowing for easy access (namely, retrieval) and updating of the signing information. Optionally, upon execution, the first application also provides API handles for implementing indirect certificate pinning when the system further comprises at least one target server. These API handles facilitate communication between the client application and the at least one target server.

Optionally, the data repository refers to a systematic collection of the signing information that is associated with the certificate information server. Optionally, the data repository is implemented at a remote memory associated with the certificate information server. Examples of the remote memory may include, but are not limited to, a cloud-based memory, a blockchain-based memory, computer-cluster based memory (e.g.: Remote Direct Memory Access memory), and a distributed memory. Alternatively, optionally, the data repository is implemented at a local memory associated with the certificate information server. Examples of the local memory may include, but are not limited to, a Solid State Drive (SSD) memory (such as a flash memory, a memory stick, a Secure Digital (SD) card, and the like), a hard disk drive (HDD) memory, a floppy disk, a portable compact disc read-only memory (CD-ROM), and a digital versatile disk (DVD). Yet alternatively, optionally, the data repository is implemented in a distributed manner at both the remote memory and the local memory associated with the certificate information server.

Optionally, the certificate information server is configured to execute the first application to also implement, at a given date and time, key rotation for any signing key pair which, at the given date and time, lies within a predefined threshold from its expiration date and time. The term "key rotation" refers to a change of keys in the given signing key pair. The keys in the given signing key pair may be changed at regular intervals, depending on intervals of its expiration dates and times.

Optionally, multiple versions of the given signing key pair exist simultaneously, during the key rotation of the given signing key pair. This is so because an older version of the given signing key pair that is set to expire at its expiration date and time has not yet expired but a new version of the given signing key pair that will be valid from the expiration date and time of the older version of the given signing key pair has already been generated in advance. Notably, the older version of the given signing key pair is not invalidated immediately. In a time duration where the multiple versions of the given signing key pair exist simultaneously, the security certificate of the certificate information server may be signed using any or both of the multiple versions of the given signing key pair. It is beneficial to implement key rotation for signing key pairs, since key rotation ensures updating of the signing key pairs for security purposes. Moreover, if key rotation for the given signing key pair is not performed within the predefined threshold from its expiration date and time, the given signing key pair may expire, which will, in-turn, disrupt the communication between the client application and the certificate information server as the signature for the given signing key pair will not be validated successfully. It will be appreciated that key rotation assists in ensuring smooth and safe communication between the client application and the certificate information server.

Optionally, when key rotation is implemented for a given signing key pair, a corresponding version number and expiration date and time associated with the given signing key pair are also updated. Next key rotation of the given signing key pair would be implemented according to the updated version number and expiration date and time.

Optionally, when the key rotation is implemented, the client application is configured to notify the user of the client device to update the client application. This notification may be a push notification, an audio notification, a text notification, and the like. The notification serves as a security update notification for the user and provides the expiration date and time for the signing key pair for which the key rotation is implemented. The notification also directs the user to update the client application prior to such expiration date and time. The update to the client application would have a new version of the public signing key baked-in, wherein the new version of the public signing key corresponds to a new version of the signing key pair (i.e., new versions of its public and private keys) for which the key rotation is implemented. In this way, the client application reacts gracefully to key rotation and doesn't block the user from using the client application. Optionally, the certificate information server is configured to store expired signing key pairs at the data repository that is communicably coupled with the certificate information server. The expired signing key pairs are no longer used for signing the security certificate and are stored for audit purposes.

The predefined threshold provides a buffer period prior to expiration of the given signing key pair, within which a validity of the given signing key pair is intact, but a new version of the signing key pair is to be generated for future use. The client application is updated (by the user) with the new version of the given signing key pair within the predefined threshold, prior to expiration of the old version of the given signing key pair. The predefined threshold could have a fixed value, or could be a percentage of a time duration of validity of the given signing key pair. As an example, the predefined threshold may lie in a range of 5 percent to 10 percent of the time duration of validity of the given signing key pair. When, for example, the time duration of validity of the given signing key pair is 100 days, the predefined threshold may be 7 days. Therefore, key rotation for the given signing key pair may be implemented any time between the 93rd day and the 100th day of validity of the given signing key pair. As another example, the predefined threshold may lie in a range of 1-30 days, when the time duration of validity of the given signing key pair is greater than 100 days.

The connection of the client device with the certificate information server is enabled on validation of the signatures using the security certificate and the public signing key pinned to the client application, by the client application. Once the signatures are validated, authenticity of the security certificate is established, which in turn also establishes the authenticity of the certificate information server. When the client application establishes authenticity of the certificate information server, the client device is able to connect with the certificate information server and exchange data securely.

Optionally, when validating the signatures using the security certificate and the public signing key, the client application is configured to:
  check whether or not one of the signatures of the security certificate matches the public signing key; and
  establish a successful connection between the client device and the certificate information server, when the one of the signatures matches the public signing key.

Optionally, each of the signatures of the security certificate is checked for matching with the public signing key using a verification technique that employs a verifying algorithm. The verifying algorithm takes as input the content of the security certificate of the certificate information server, the signatures of the security certificate, and the (pinned) public signing key, and produces as output a verification result which is either true (for successful validation) or false (for unsuccessful validation). The verification result is true for a given signature of the security certificate when the given signature is determined to have been calculated using a private key that is paired with the pinned public signing key; otherwise, the verification result is false. Upon successful validation of a given signature amongst the signatures, it is verified that the content of the security certificate was indeed signed as the given signature by a private key that is paired with the (pinned) public signing key. In such a scenario, the successful connection between the client device and the certificate information server is established. In another scenario, the public signing key does not match any of the signatures of the security certificate. In such a scenario, the connection between the client device and the certificate information server is not established.

Optionally, the system further comprises at least one target server communicably coupled with the client device and the certificate information server, and a data repository communicably coupled with the certificate information server, wherein the certificate information server is configured to store, at the data repository, at least: deployment data of the at least one target server, address of the at least one target server, at least one public signing key of the at least one target server, wherein, upon execution, the client application is configured to:

send to the certificate information server, a connection request for connecting to a given target server;

receive, from the certificate information server, pinning information of the certificate information server and connection information pertaining to the given target server, wherein the connection information comprises at least an address of the given target server and a public signing key of the given target server, wherein the pinning information comprises at least the security certificate of the certificate information server and a signature of the security certificate;

validate the pinning information using a public signing key of the certificate information server that is pinned to the client application, for enabling connection of the client device with the given target server via the certificate information server;

receive, from the given target server, a security certificate of the given target server; and establish a connection of the client device with the given target server, by validating the security certificate of the given target server using at least the public signing key of the given target server.

Throughout the present disclosure, the term "target server" refers to hardware, software, firmware, or a combination of these for providing resources to the client application. The resources may include but not be limited to data, services, or programs. As an example, a given target server may be used for backing up and storing data of at least one client application in real time or near real time. Optionally, the at least one target server hosts a software that may be utilised by the client application. Optionally, the target server comprises a target database for storing data in an organized (namely, structured) manner, thereby, allowing for easy access (namely, retrieval) and updating of said data. Optionally, the target server is communicably coupled with the certificate information server via a second communication network. The target server is communicably coupled with the client device via the certificate information server. Optionally, the target server is connected to the certificate information server via an Application Programming Interface (API) in the second communication network. Optionally, the first communication network and the second communication network are same. For example, both the first communication network and the second communication network are implemented as the Internet. Alternatively, optionally, the first communication network and the second communication network are different. For example, the first communication network is the Wi-Fi network, while the second communication network is the Internet.

The "deployment data of the at least one target server" pertains to data corresponding to deployment of the at least one target server. The deployment data is required for effectively deploying the at least one target server and subsequently for the using the at least one target server. The deployment data is required by the client application for connecting to the at least one target server. Optionally, the deployment data of the at least one target server comprises at least one of: a deployment identification document (ID), a company name, a company address, a plurality of login details, a public signing key, of the at least one target server. The address of the at least one target server relates to a physical or virtual address of the at least one target server. Optionally, the at least one target server is associated with at least one signing key pair. The at least one signing key pair is used to sign the security certificate of the at least one target server. The at least one signing key pair is generated by the at least one target server, using key pair generation techniques.

The connection request is made by the client application to the certificate information server, indicating that the client application wishes to establish a secure communication with the given target server. Optionally, the connection request is sent via the communicable coupling of the client device with the certificate information server. Optionally, the connection request for connecting with the given target server is different from the connection request for connection with the certificate information server.

The pinning information of the certificate information server is used for implementing indirect pinning in the system. Optionally, the pinning information further comprises the signing information pertaining to the security certificate of the certificate information server. The connection information pertaining to the given target server is required for the client application to connect to the at least one target server. Notably, the public signing key of the given target server is not pinned to the client application, but is only sent to the client application by the certificate information server when the client application sends the connection request for connecting to the given target server. In this way, the public signing key of the given target server that is sent to the client application is always up to date, and the connection which would be established between the client device and the given target server would be seamless and it is beneficially decoupled from the life cycle of the security certificate of the given target server. The given target server can use any certificate life cycle management solution, as tight coupling between the security certificate and the given target server is removed in the system, whilst still providing protection against Man In The Middle (MITM) attacks.

Optionally, the pinning information is validated using the public signing key of the certificate information server that is pinned to the client application by checking whether or not one of the signatures of the security certificate of the certificate information server matches the public signing key, and enabling connection of the client device with the given target server via the certificate information server, when the one of the signatures matches the public signing key. Signature validation has been described previously in detail.

Optionally, upon validation of the pinning information, the client application receives the security certificate of the given target server. The security certificate of the given target server refers to the digital certificate that is utilised as the security means through which identity, authenticity and reliability of the given device is established. Optionally, the security certificate of the given target server is signed using signatures of the security certificate for at least one signing key pair of the at least one target server that is valid at a time of receiving the connection request at the certificate information server. The at least one signing key pair of a given target server includes a public key and a private key. Optionally, the public key of the given target server corresponds to the public signing key which saved the data repository by the certificate information server. Optionally, a given signature for a given signing key pair of the at least one target server is generated using content of the security certificate of the target server and a private key of the given signing key pair, wherein a public key of the given signing key pair of the at least one target server is generated using the private key of the given signing key pair. Optionally, in this regard, the given signature for the given signing key pair of the target server is generated using a signing algorithm. Techniques for generating signatures of security certificates are well known in the art.

Optionally, when validating the security certificate of the given target server, the client application is configured to:
- check whether or not one of the signatures of the security certificate matches the public signing key of the given target server; and
- establish a successful connection between the client device and the given target server, when the one of the signatures matches the public signing key of the given target server.

Optionally, each of the signatures of the security certificate of the given target server is checked for matching with the public signing key of the given target server using a verification technique that employs a verifying algorithm. The verifying algorithm takes as input the content of the security certificate of the given target server, the signatures of the security certificate, and the public signing key of the given target server, and produces as output a verification result which is either true (for successful validation) or false (for unsuccessful validation). The verification result obtained using the verifying algorithm is true for a given signature of the security certificate when the given signature is determined to have been calculated using a private key that is paired with the public signing key of the given target server; otherwise, the verification result is false. Upon successful validation of a given signature amongst the signatures, it is verified that the content of the security certificate of the given target server was indeed signed as the given signature by a private key that is paired with the public signing key of the given target server. In such a scenario, the successful connection between the client device and the given target server is established. In another scenario, the public signing key of the given target server does not match any of the signatures of the security certificate of the given target server. In such a scenario, the connection between the client device and the given target server is not established.

Optionally, the certificate information server is configured to execute the first application to also:
- store a shared private key at the data repository;
- send the shared private key to a second application executing on the given target server, wherein the second application stores the shared private key at a memory of the given target server;
- receive, from the second application, a signed request notifying the certificate information server of the connection information of the given target server, the signed request being sent by the second application at least at a start time of the given target server and at every time of implementing key rotation by the given target server, and wherein the signed request is signed using the shared private key; and
- validate the signed request using the shared private key, for verifying authenticity of the given target server.

Optionally, the shared private key is a security key that is shared between the certificate information server and the given target server. The shared private key is shared at a time of deploying the given target server. The first application and the second application are different from each other and communicate with each other. The first application and the second application store the shared private key in unrelated manners, which may be same as or different from each other. The memory of the given target server includes persistent storage (for example, such as a remote memory and/or a local memory) associated with the given target server. A request that is to be sent by the given target server to the certification information server is signed for creating the signed request. The request comprises the connection information of the given target server. Optionally, the shared private key is used by the second application to sign the request (that is to be sent by the given target server) for creating the signed request. This way the certificate information server can later verify that the given target server sending its connection information is indeed one of (known) target servers and that the contents of the request are genuine.

Optionally, in this regard, the signed request is a request sent by the given target server to the certification information server, for notifying the certification information server of its current public data. Moreover, optionally, the deployment data of the given target server also comprises the shared private key. Such public data is the deployment data of the given target server and includes the address of the given target server, company name, public signing keys given target server that are valid at that moment, and the like. Optionally, the signed request is also sent by the second application periodically. In this regard, a time interval upon which the signed request is periodically sent is selected suitably to ensure that the connection information (of the given target server) available with the certificate information server is reasonably up-to-date. For example, the signed request may be sent by the second application periodically after 10 days.

Optionally, when creating the signed request, the second application is configured to:
- sort and concatenate fields and values pertaining to the signed request to obtain a first data string;
- add the shared private key to the first data string to generate a second data string; and
- create a hash of the second data string, wherein the hash serves as a signature of the signed request.

In this regard, the fields and values in the signed request pertain to the connection information of the given target server. The hash of the second data string is created using well-known hash generation techniques.

Optionally, for validation of the signed request, the first application performs the same steps as implemented by the second application for creation of the signed request. The first application also creates a signature using the same shared private key known for the target server. The resulting signature obtained by the first application must be the same as the signature sent (by the second application) along with the signed request, for successful validation of the signed request. In other words, validation of the signed request is performed by validation of the signature of the signed request. Optionally, the shared private key is used to validate the signed request that is sent by the given target server. When the signed request is successfully validated using the shared private key, the authenticity of the given target server is verified, and vice versa. Optionally, upon successful validation of the signed request, it is checked whether or not the fields and values in the signed request match with corresponding fields and values in the data repository. In case of a match, the corresponding fields and values in the data repository stay unchanged. In case of a mismatch, the corresponding fields and values in the data repository are updated to match the fields and values in the signed request.

Optionally, the at least one target server is configured to execute the second application to also implement, at a given date and time, key rotation for any signing key pair of the at least one target server which, at the given date and time, lies within a predefined threshold from its expiration date and time.

Optionally, each signed request is saved in an audit log, wherein the audit log is maintained at the data repository associated with the certificate information server. Furthermore, optionally, upon receiving the signed request, the first application executing on the certificate information server is configured to send a notification to a device of a system administrator of the system for implementing indirect certificate pinning.

The present disclosure also relates to the method as described above. Various embodiments and variants disclosed above, with respect to the aforementioned system, apply mutatis mutandis to the method.

Optionally, the method further comprising executing a first application at the certificate information server for at least producing the signing information.

Optionally, in the method, a given signing key pair comprises a private key and a public key, the given signing key pair being associated with a corresponding version number and expiration date and time.

Optionally, the method further comprises executing the first application for implementing, at a given date and time, key rotation for any signing key pair which, at the given date and time, lies within a predefined threshold from its expiration date and time.

Optionally, in the method, the step of validating the signatures using the security certificate and the public signing key comprises:
  checking whether or not one of the signatures of the security certificate matches the public signing key; and
  establishing a successful connection between the client device and the certificate information server, when the one of the signatures matches the public signing key.

Optionally, the system further comprises at least one target server communicably coupled with the client device and the certificate information server, and a data repository communicably coupled with the certificate information server, wherein method further comprises:
  storing, at the data repository, at least: deployment data of the at least one target server, address of the at least one target server, at least one public signing key of the at least one target server,
  sending, from the client application to the certificate information server, a connection request for connecting to a given target server;
  receiving, from the certificate information server at the client application, pinning information of the certificate information server and connection information pertaining to the given target server, wherein the connection information comprises at least an address of the given target server and a public signing key of the given target server, wherein the pinning information comprises at least the security certificate of the certificate information server and a signature of the security certificate;
  validating the pinning information using a public signing key of the certificate information server that is pinned to the client application, for enabling connection of the client device with the given target server via the certificate information server;
  receiving, from the given target server, a security certificate of the given target server; and
  establishing a connection of the client device with the given target server, by validating a security certificate of the given target server using at least the public signing key of the given target server.

Optionally, the method further comprises executing the first application for:
  storing a shared private key at the data repository;
  sending the shared private key to a second application executing on the given target server, wherein the second application stores the shared private key at a memory of the given target server;
  receiving, from the second application, a signed request notifying the certificate information server of the connection information of the given target server, the signed request being sent by the second application at a start time of the given target server and at every time of implementing key rotation by the given target server, and wherein the signed request is signed using the shared private key; and
  validating the signed request using the shared private key, for verifying authenticity of the given target server.

The present disclosure also relates to the client device as described above. Various embodiments and variants disclosed above, with respect to the aforementioned system and method, apply mutatis mutandis to the client device.

The present disclosure also relates to the certificate information server as described above. Various embodiments and variants disclosed above, with respect to the aforementioned system, method and client device, apply mutatis mutandis to the certificate information server.

The present disclosure also relates to a computer program product for implementing indirect certificate pinning, the computer program product comprising a non-transitory machine-readable data storage medium having stored thereon program instructions that, when accessed by a processing device, cause the processing device to:
  send, to a certificate information server, a connection request for connecting to the certificate information server;
  receive, from the certificate information server, a security certificate of the certificate information server and signing information pertaining to the security certificate, wherein the signing information comprises: signatures of the security certificate for at least one signing key pair that is valid at a time of receiving the connection request at the certificate information server, a version number of the at least one signing key pair, expiration details of the at least one signing key pair; and
  validate the signatures using the security certificate and the public signing key, for enabling connection of the processing device with the certificate information server.

Throughout the present disclosure, the term "computer program product" refers to a software product comprising program instructions that are recorded on the non-transitory machine-readable data storage medium, wherein the software product is executable upon a computing hardware (i.e., the processing device) for implementing the aforementioned steps of the method for implementing indirect certificate pinning.

The program instructions stored on non-transitory machine-readable data storage medium can direct the processing device to function in a particular manner, such that the processing device executes processing steps for implementing indirect certificate pinning. Examples of the non-transitory machine-readable data storage medium includes, but are not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, or any suitable combination thereof.

Throughout the present disclosure, the term "processing device" refers to a device that is capable of processing the program instructions of the computer program product. Optionally, the processing device is implemented as a part of the client device. The processing device may, for example, be a microprocessor, a microcontroller, a processing unit, or similar.

DETAILED DESCRIPTION OF THE DRAWINGS

Referring to FIG. 1, illustrated is an architecture of a system 100 for implementing indirect certificate pinning, in accordance with an embodiment of the present disclosure. The system 100 for implementing indirect certificate pinning comprises a client device 102 configured to execute a client application 104 and a certificate information server 106 communicably coupled with the client device 102.

Figure 2:
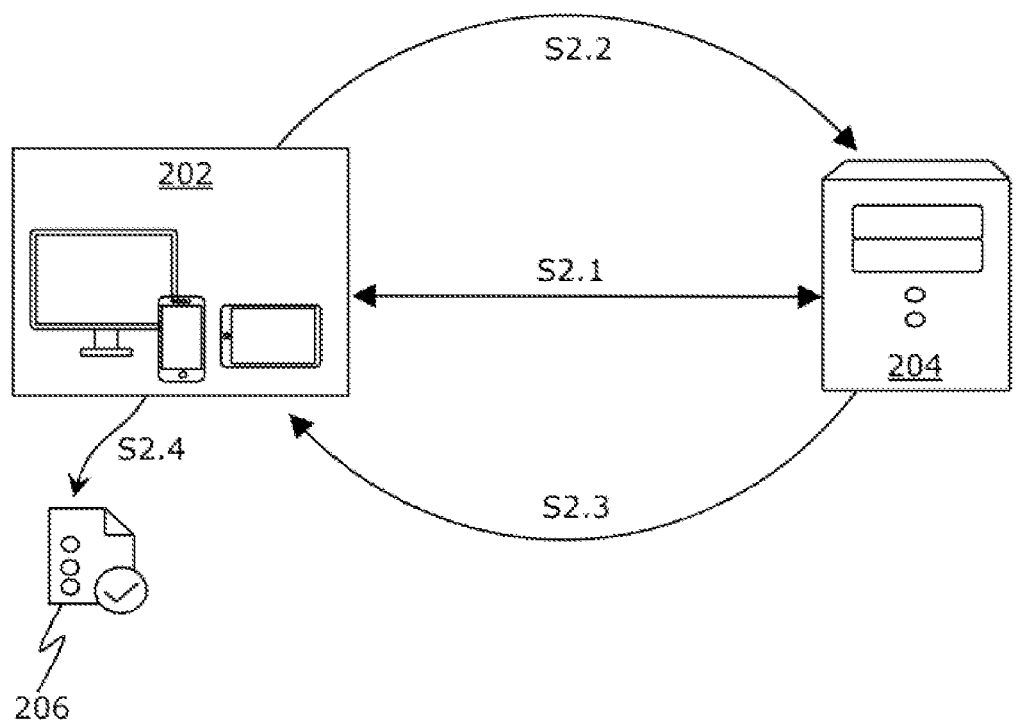
FIG. 2 is a first exemplary process flow implemented by a system for implementing indirect certificate pinning, in accordance with an embodiment of the present disclosure.

Referring to FIG. 2, illustrated is a first exemplary process flow implemented by a system for implementing indirect certificate pinning, in accordance with an embodiment of the present disclosure. The first exemplary process flow is implemented for enabling connection of a client device 202 with a certificate information server 204. At step S2.1, a client application (executed at the client device 202) is communicably coupled with the certificate information server 204. Herein, the client application has a public signing key pinned thereto. At step S2.2, the client application sends a connection request to the certificate information server 204 for connecting to the certificate information server 204. At step S2.3, the client application receives from the certificate information server 204, a security certificate 206 of the certificate information server 204 and signing information pertaining to the security certificate 206, wherein the signing information comprises signatures of the security certificate 206 for at least one signing key pair. Herein, a given signing key pair comprises a private key and a public key. At step S2.4, the client application validates the signatures using the security certificate 206 and the public signing key, for enabling connection of the client device 202 with the certificate information server 204.

Figure 3:
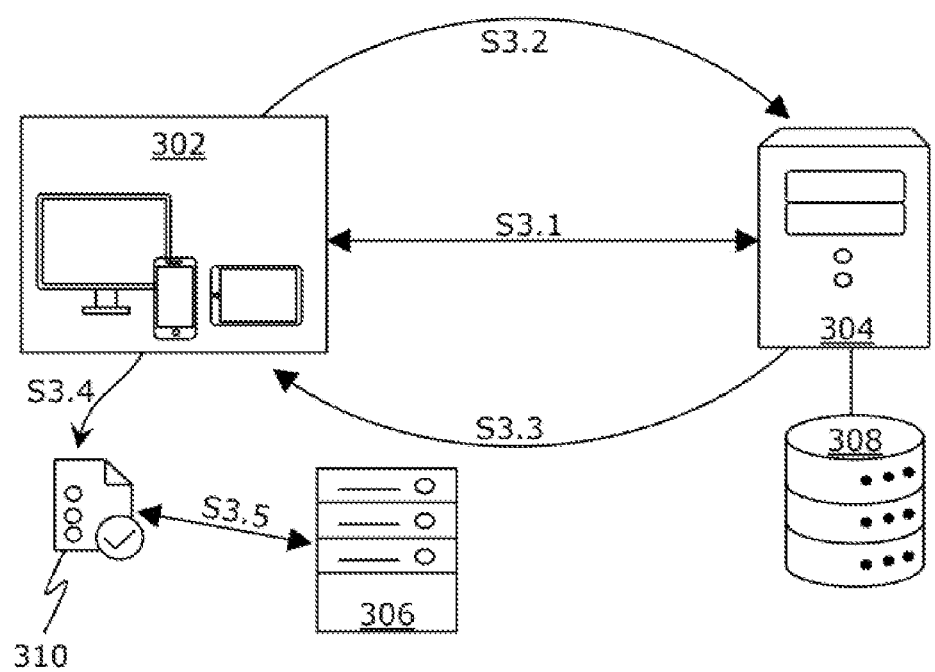
FIG. 3 is a second exemplary process flow implemented by a system for implementing indirect certificate pinning, in accordance with an embodiment of the present disclosure.

Referring to FIG. 3, illustrated is a second exemplary process flow implemented by a system for implementing indirect certificate pinning, in accordance with an embodiment of the present disclosure. The second exemplary process flow is implemented for enabling connection of a client device 302, via a certificate information server 304, to a target server 306. At step S3.1, a client application (executed at the client device 302) is communicably coupled with the certificate information server 304. The system further comprises the target server 306 communicably coupled with the client device 302 and the certificate information server 304. The client application has a public signing key pinned thereto. The certificate information server 304 is communicably coupled to a data repository 308, wherein the certificate information server 304 is configured to store at the data repository 308, at least: deployment data of the target server 306, address of the target server 306, and at least one public signing key of the target server 306. At step S3.2, the client application sends a connection request for connecting to the target server 306, to the certificate information server 304. At step S3.3, the client application receives from the certificate information server 304, pinning information of the certificate information server 304 and connection information pertaining to the target server 306, wherein the connection information comprises at least an address of the target server 306 and a public signing key of the target server 306, and wherein the pinning information comprises a security certificate 310 of the certificate information server 304 and a signature of the security certificate. At step S3.4, the client application validates the pinning information using the public signing key of the certificate information server 304 that is pinned to the client application, for enabling connection of the client device with the target server 306 via the certificate information server 304. At step S3.5, the client application receives a security certificate (not shown) of the target server 306 from the target server 306, and establishes a connection of the client device with the target server 306, by validating the security certificate of the target server 306 using at least the public signing key of the target server 306.

Figure 4:
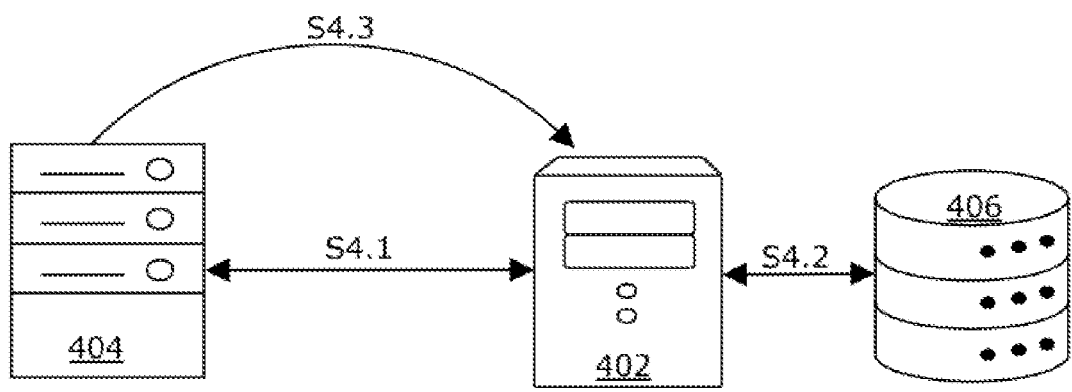
FIG. 4 is a third exemplary process flow implemented by a system for implementing indirect certificate pinning, in accordance with an embodiment of the present disclosure.

FIG. 4 is a third exemplary process flow implemented by a system for implementing indirect certificate pinning, in accordance with an embodiment of the present disclosure. The third exemplary process flow is implemented for delivering data (such as connection information) to a certificate information server 402, from a target server 404. At step S4.1, the certificate information server 402 is communicably coupled with the target server 404. Herein, the certificate information server 402 is configured to execute a first application to send a shared private key to a second application executing on the target server 404, wherein the second application stores the shared private key at a memory (not shown) of the target server 404. At step S4.2, the certificate information server 402 is communicably coupled to a data repository 406, at which the certificate information server 402 is configured to execute the first application to store at least: deployment data of the target server 404, address of the target server 404, at least one public signing key of the target server 404, and the shared private key. At step S4.3, the certificate information server 402 is configured to execute the first application to receive from the target server 404, a signed request notifying the certificate information server 402 of connection information of the target server 404, wherein the signed request is signed using the shared private key. Next, the certificate information server 402 is configured to execute the first application to validate the signed request using the shared private key, for verifying authenticity of the target server 404.

FIGS. 2, 3, and 4 include simplified process flows for the sake of clarity only, which should not unduly limit the scope of the claims herein. The person skilled in the art will recognize many variations, alternatives, and modifications of embodiments of the present disclosure. As an example, the second exemplary process flow encompasses the steps of the first exemplary process flow, whilst also including additional steps. As another example, the third exemplary process flow may be implemented prior to implementing the second exemplary process flow, as well as during the implementation of the second exemplary process flow.

Figure 5:
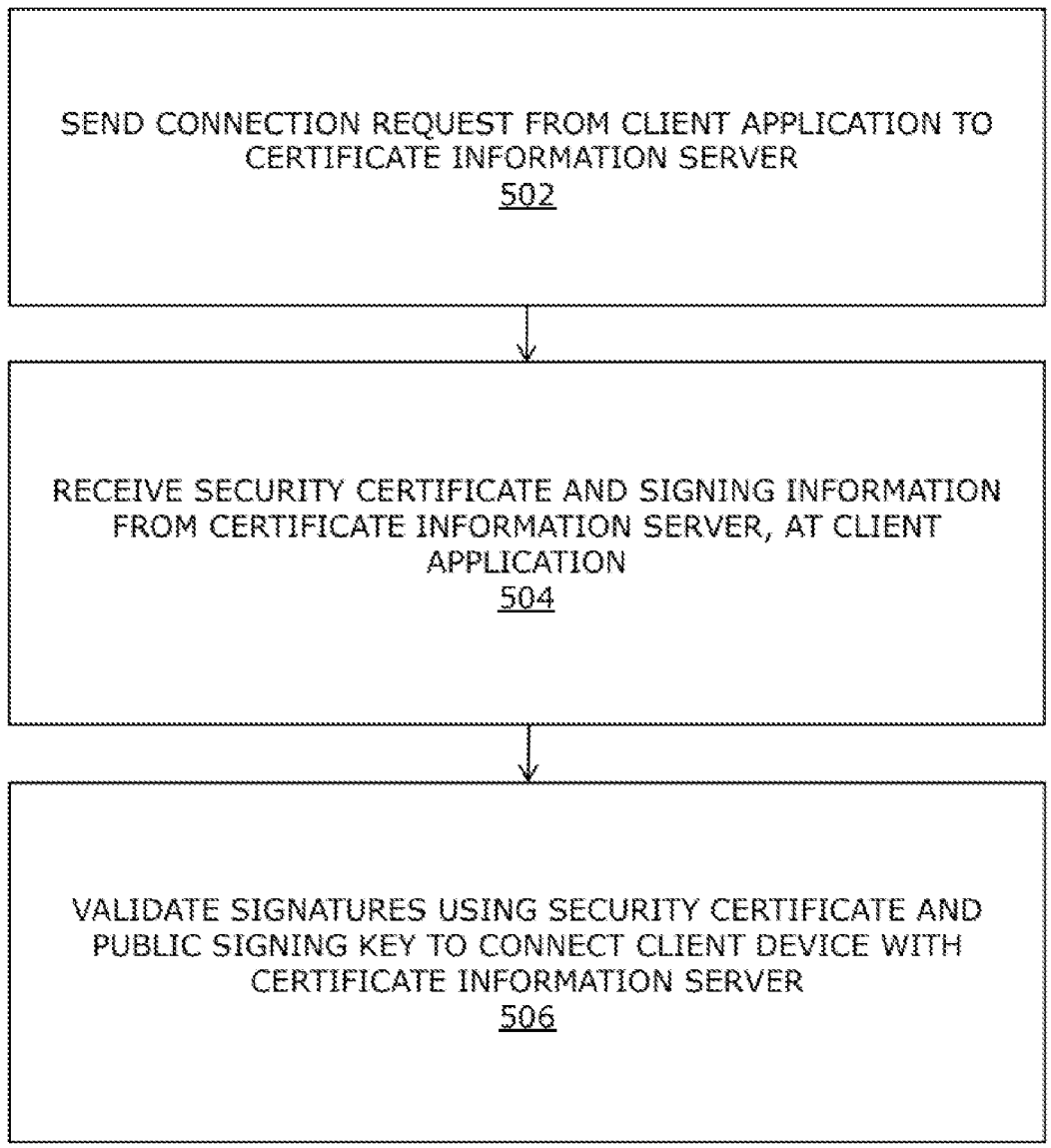
FIG. 5 is a flowchart depicting steps of a method for implementing indirect certificate pinning, in accordance with an embodiment of the present disclosure.

Referring to FIG. 5, illustrated is a flowchart depicting steps of a method for implementing indirect certificate pinning, in accordance with an embodiment of the present disclosure. The method is implemented by a system comprising a client device configured to execute a client application, the client application having a public signing key pinned thereto, and a certificate information server communicably coupled with the client device. At step 502, a connection request is sent, from the client application to the certificate information server, for connecting to the certificate information server. At step 504, a security certificate of the certificate information server and signing information pertaining to the security certificate are received by the client application from the certificate information server. The signing information comprises signatures of the security certificate for at least one signing key pair that is valid at a time of receiving the connection request at the certificate information server, a version number of the at least one signing key pair, and expiration details of the at least one signing key pair. At step 506, the signatures are validated by the client application, using the security certificate and the public signing key, for enabling connection of the client device with the certificate information server.

The steps 502, 504, and 506 are only illustrative and other alternatives can also be provided where one or more steps are added, one or more steps are removed, or one or more steps are provided in a different sequence without departing from the scope of the claims herein. As an example, the method corresponds to the first exemplary process flow described in FIG. 2.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for implementing indirect certificate pinning, the system comprising:
    a client device configured to execute a client application, the client application having a public signing key pinned thereto; and
    a certificate information server communicably coupled with the client device,
    wherein, upon execution, the client application is configured to:
    send, to the certificate information server, a connection request for connecting to the certificate information server;
    receive, from the certificate information server, a security certificate of the certificate information server and signing information pertaining to the security certificate, wherein the signing information comprises: signatures of the security certificate for at least one signing key pair that is valid at a time of receiving the connection request at the certificate information server, a version number of the at least one signing key pair, expiration details of the at least one signing key pair; and
    validate the signatures using the security certificate and the public signing key, for enabling connection of the client device with the certificate information server.

2. A system of claim 1, wherein the certificate information server is configured to execute a first application to at least produce the signing information.

3. A system of claim 2, wherein the certificate information server is configured to execute the first application to also implement, at a given date and time, key rotation for any signing key pair which, at the given date and time, lies within a predefined threshold from its expiration date and time.

4. A system of claim 1, wherein a given signing key pair comprises a private key and a public key, the given signing key pair being associated with a corresponding version number and expiration date and time.

5. A system of claim 1, wherein, when validating the signatures using the security certificate and the public signing key, the client application is configured to:
    check whether or not one of the signatures of the security certificate matches the public signing key; and
    establish a successful connection between the client device and the certificate information server, when the one of the signatures matches the public signing key.

6. A system of claim 1, further comprising at least one target server communicably coupled with the client device and the certificate information server, and a data repository communicably coupled with the certificate information server,
    wherein the certificate information server is configured to store, at the data repository, at least:
    deployment data of the at least one target server, address of the at least one target server, at least one public signing key of the at least one target server,
    wherein, upon execution, the client application is configured to:
    send to the certificate information server, a connection request for connecting to a given target server;
    receive, from the certificate information server, pinning information of the certificate information server and connection information pertaining to the given target server, wherein the connection information comprises at least an address of the given target server and a public signing key of the given target server, wherein the pinning information comprises at least the security certificate of the certificate information server and a signature of the security certificate;
    validate the pinning information using a public signing key of the certificate information server that is pinned to the client application, for enabling connection of the client device with the given target server via the certificate information server;
    receive, from the given target server, a security certificate of the given target server; and
    establish a connection of the client device with the given target server, by validating the security certificate of the given target server using at least the public signing key of the given target server.

7. A system of claim 6, wherein the certificate information server is configured to execute a first application to also:
    store a shared private key at the data repository;
    send the shared private key to a second application executing on the given target server, wherein the second application stores the shared private key at a memory of the given target server;
    receive, from the second application, a signed request notifying the certificate information server of the connection information of the given target server, the signed request being sent by the second application at a start time of the given target server and at every time of implementing key rotation by the given target server, and wherein the signed request is signed using the shared private key; and validate the signed request using the shared private key, for verifying authenticity of the given target server.

8. A method for implementing indirect certificate pinning, the method being implemented by a system comprising a client device configured to execute a client application, the client application having a public signing key pinned thereto, and a certificate information server communicably coupled with the client device, the method comprising:
  sending, from the client application to the certificate information server, a connection request for connecting to the certificate information server;
  receiving, from the certificate information server at the client application, a security certificate of the certificate information server and signing information pertaining to the security certificate, wherein the signing information comprises: signatures of the security certificate for at least one signing key pair that is valid at a time of receiving the connection request at the certificate information server, a version number of the at least one signing key pair, expiration details of the at least one signing key pair; and
  validating the signatures using the security certificate and the public signing key, for enabling connection of the client device with the certificate information server.

9. A method of claim 8, further comprising executing a first application at the certificate information server for at least producing the signing information.

10. A method of claim 9, further comprising executing the first application for implementing, at a given date and time, key rotation for any signing key pair which, at the given date and time, lies within a predefined threshold from its expiration date and time.

11. A method of claim 8, wherein a given signing key pair comprises a private key and a public key, the given signing key pair being associated with a corresponding version number and expiration date and time.

12. A method of claim 8, wherein the step of validating the signatures using the security certificate and the public signing key comprises:
  checking whether or not one of the signatures of the security certificate matches the public signing key; and
  establishing a successful connection between the client device and the certificate information server, when the one of the signatures matches the public signing key.

13. A method of claim 8, wherein the system further comprises at least one target server communicably coupled with the client device and the certificate information server, and a data repository communicably coupled with the certificate information server,
  wherein method further comprises:
    storing, at the data repository, at least: deployment data of the at least one target server, address of the at least one target server, at least one public signing key of the at least one target server,
    sending, from the client application to the certificate information server, a connection request for connecting to a given target server;
    receiving, from the certificate information server at the client application, pinning information of the certificate information server and connection information pertaining to the given target server, wherein the connection information comprises at least an address of the given target server and a public signing key of the given target server, wherein the pinning information comprises at least the security certificate of the certificate information server and a signature of the security certificate;
    validating the pinning information using a public signing key of the certificate information server that is pinned to the client application, for enabling connection of the client device with the given target server via the certificate information server;
    receiving, from the given target server, a security certificate of the given target server; and
    establishing a connection of the client device with the given target server, by validating the security certificate of the given target server using at least the public signing key of the given target server.

14. A method of claim 13, further comprising executing a first application for:
  storing a shared private key at the data repository
  sending the shared private key to a second application executing on the given target server, wherein the second application stores the shared private key at a memory of the given target server;
  receiving, from the second application, a signed request notifying the certificate information server of the connection information of the given target server, the signed request being sent by the second application at a start time of the given target server and at every time of implementing key rotation by the given target server, and wherein the signed request is signed using the shared private key; and
  validating the signed request using the shared private key, for verifying authenticity of the given target server.

15. A client device arranged to be used in a system for implementing indirect certificate pinning, the system comprising the client device and a certificate information server communicably coupled with the client device, wherein the client device is configured to execute a client application to:
  send, to a certificate information server, a connection request for connecting to the certificate information server;
  receive, from the certificate information server, a security certificate of the certificate information server and signing information pertaining to the security certificate, wherein the signing information comprises: signatures of the security certificate for at least one signing key pair that is valid at a time of receiving the connection request at the certificate information server, a version number of the at least one signing key pair, expiration details of the at least one signing key pair; and
  validate the signatures using the security certificate and a public signing key, for enabling connection of the client device with the certificate information server, wherein the public signing key is pinned to the client application.

16. A hardware certificate information server arranged to be used in a system for implementing indirect certificate pinning, the certificate information server being communicably coupled with a client device of the system, the client device being configured to execute a client application and the client application having a public signing key pinned thereto, wherein the certificate information server is configured to:
  receive, from the client device, a connection request for connecting to the certificate information server;
  send, to the client device, a security certificate of the certificate information server and signing information pertaining to the security certificate, wherein the signing information comprises: signatures of the security certificate for at least one signing key pair that is valid at a time of receiving the connection request at the certificate information server, a version number of the at least one signing key pair, expiration details of the at least one signing key pair; and enable connection with the client device upon validation, by the client device, of the signatures using the security certificate and the public signing key.

\* \* \* \* \*